United States Patent [19]
Cannata

[11] 3,936,654
[45] Feb. 3, 1976

[54] PROCESS AND APPARATUS FOR THE PERFORMANCE OF ARC WELDING AND OVERLAYING, PREFERABLY SUBMERGED ARC

[75] Inventor: Ugo Cannata, Genoa, Italy

[73] Assignee: La Soudure Electrique Autogene, Procedes Arcos, Belgium

[22] Filed: Apr. 5, 1974

[21] Appl. No.: 458,230

[30] Foreign Application Priority Data
Feb. 21, 1974 Italy................................ 12611/73

[52] U.S. Cl. .................... 219/73; 219/76; 219/130; 226/181
[51] Int. Cl.².......................................... B23K 9/18
[58] Field of Search......... 219/73, 76, 117 HD, 130, 219/93; 226/191

[56] References Cited
UNITED STATES PATENTS

| | | | |
|---|---|---|---|
| 2,093,394 | 9/1937 | Emery | 219/130 |
| 2,190,150 | 2/1940 | Fay | 219/130 |
| 2,848,593 | 8/1958 | Newman et al. | 219/73 |
| 2,866,075 | 12/1958 | Pappelendam | 219/117 HD |
| 3,165,815 | 1/1965 | Wogerbauer | 219/93 X |
| 3,271,554 | 9/1966 | Johnson | 219/73 X |

Primary Examiner—J. V. Truhe
Assistant Examiner—N. D. Herkamp
Attorney, Agent, or Firm—Jackson, Jackson & Chovanes

[57] ABSTRACT

Arc welding and overlaying, particularly with strip electrodes, and particularly for overlaying by the submerged arc welding process with strip electrodes, can be regulated as to the distribution of arc energy by using strip electrodes which are run through male and female gears so that the current input of the electrodes is adjusted as to uniformity across the width of the overlay path.

2 Claims, 4 Drawing Figures

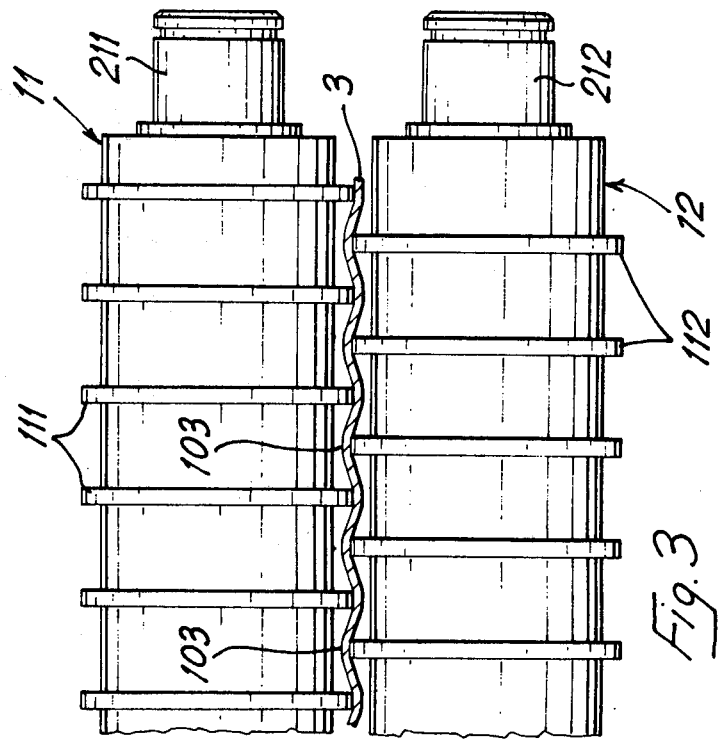
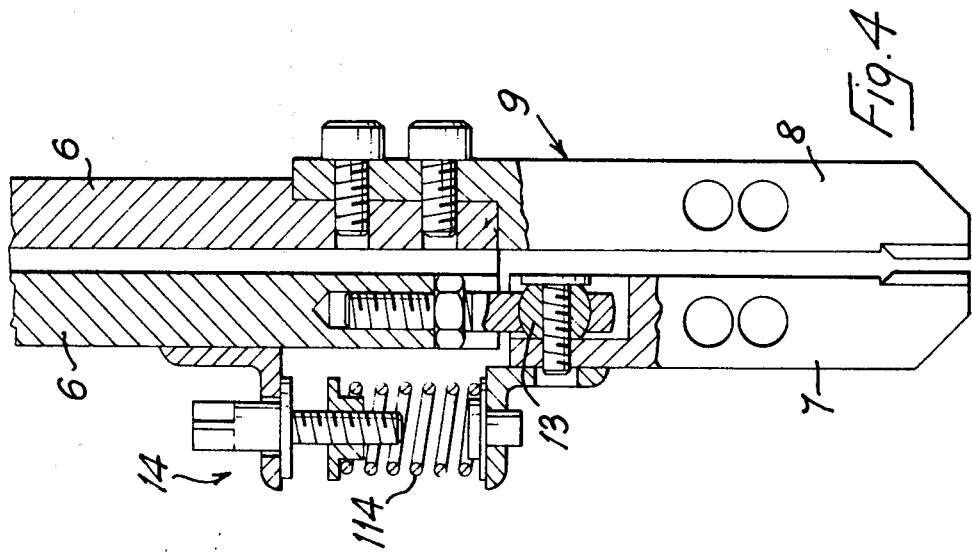

"PROCESS AND APPARATUS FOR THE PERFORMANCE OF ARC WELDING AND OVERLAYING, PREFERABLY SUBMERGED ARC

DISCLOSURE OF THE INVENTION

In certain electric welding machines which perform arc welding or overlaying operations, the filler material is fed continuously at the surface to be welded or overlaid, in the form of a solid or cored strip which is unwound regularly from a roll and is pushed forward on an electric connection device, called a slide. The unwinding of this strip from the roll and its feeding through the slide jaws are performed by means of a pulling unit in which the strip passes through the bight of at least one pair of rolls, rotating in opposite directions, which unwind the strip by frictional force and oblige it to pass between the slide jaws. The latter must constantly grip the strip itself by a certain pressure so that the electric contact resistance between the strip faces and the continuous slide surfaces is reduced to a minimum.

In Newman et al., U.S. Pat. No. 2,848,593, granted Aug. 19, 1958, in column 4, lines 6 to 9, the following statement is made:

" . . . feeding strip 30 of bent, in this case V, cross section, FIG. 4. In the latter exceptionally good electrical contact is provided between the moving strip and contactor 32 due to such bending action."

This invention is applied to a single electrode, and it depends upon distortion of such an electrode across its cross section.

There are some conspicuous troubles met with using strip electrodes. For one thing the pulling rolls on the strip are not absolutely constant, and consequently slippage between such rolls in the strip may take place causing irregularities in the way the strip is fed towards the melting zone. In the invention of Newman et al., this defect is only partially dealt with.

If the rolls having this grip are knurled, superficial irregularities are created on the strip, which hinder the electrode feeding between the slide jaws, and, moreover, increase wear and tear on the slide jaws.

On the other hand, the local contact pressure between the smooth faces of the flat strip and the corresponding surfaces of the slide jaws will, in fact, never be constant along the whole width of the strip and this, together with a number of other practically imponderable factors, such as the actual state of the strip and slide surfaces, cause extreme irregularity and variability of local values of electric contact resistance, which, as is well known, is a particularly critical factor in view of the low voltage and high intensity current values met within electric welding and overlaying techniques.

From this irregularity and variability of local values of the electric contact resistance between the strip and the slide derives the formation, equally irregular and temporary, of temporarily preferential ways of electric current flow all along the strip, so that the arc which, because of its nature, is bound to range itself in line with such preferential ways, will cause an irregular consumption of the strip metal along the line of attack of the welding face, which face will, therefore, show a curved profile, derived from its irregular erosion. These irregularities have an effect on the quality and appearance of welding or overlaying carried out in this way.

All the above mentioned difficulties can be ascribed to the natural flat shape of the welding electrode or to its V-shape, so that until now, the only way to reduce or eliminate these difficulties seems to be to restrict the width of the strip or control the width-thickness ratio of the strip itself. In fact the maximum practical width allowed heretofore for the strip electrode was around 50-60 mm.

The present invention is based on a more thorough investigation of the reasons which cause the above mentioned difficulties and the consequent necessity of limiting the width of the welding strip. As a matter of fact the difficulty of reconciling a regular introduction of the strip between the slide jaws with the maintenance of an adequate effort of the jaws themselves exerting pressure against the surfaces of the strip, depends not so much on the width and thickness of the strip, or their ratio, but on the rigidity of the strip particularly in plan, that is the modulus of transverse rigidity of the strip and therefore ultimately on the geometric moment of inertia of its cross section which, as is known, does not depend only on the width and thickness of the strip, but also and more especially on the geometrical configuration of its cross section.

More particularly, any undulated configuration impressed longitudinally on the flat strip will result in an increase of the modulus of rigidity compared to the correspondingly flat strip.

Starting from this fundamental consideration, the present invention has developed a process for electrical arc welding and overlaying, particularly submerged arc in a fluxing agent or flux, according to which a flat strip of filler material, that is regularly fed by a suitable source, like a coil, toward the surface of the object on which arc welding or overlaying is being performed, passing through the vise of a slide which feeds the electrical welding current to the arc, is subjected to mechanical treatment, which deforms the strip permanently before it passes through the slide jaws, according to a configuration of deformation which causes an increase in the modulus of transverse rigidity of the strip deformed in this way in respect to the corresponding modulus of the original flat strip.

In one of the preferred forms of the invention, a strip deformed in this way shows a regular set of initiated undulated which occur in the direction of the length of the strip itself.

When there is a pulling unit which holds the strip and unwinds it from a roll, pushing it between the slide jaws at a rate of progression regulated in accordance with the necessities of the welding or overlaying that has to be performed, the formation of undulated on the strip can be effected in this unit, in concomitance with the pulling exerted by the unit itself on the strip.

If the pulling unit includes a pair of pulling rolls, rotating in opposite directions which hold the strip tight in their bight, thereby pulling it by frictional force from the rolls, forcing it at the same time to advance through the vise of the slide jaws, the periphery of these rolls can be shaped in such a way as to mould the metal strip, while being pulled by the rolls themselves, according to a desired undulated profile.

In particular, each of the pulling rolls may show peripherically a respective series of annular projections, axially interspaced between themselves, with the projections of one series axially joggled with respect to another series, as well as radially interspersed with the latter for a certain depth of interspersion, so that the flat metal strip is gripped and forced to pass on these interspersed projections which thus deform the strip according to a series of longitudinal undulated, which depend on the number, position and profile, as well as the depth of interspersion of the projections themselves.

From the use of a strip shaped according to the process of the present invention, numerous and unexpected advantages are derived. First of all, the back of projections of the pulling rolls holds the strip along the lines which correspond to the bottom of the undulation cove of the strip, while the slide jaws hold the strip itself along lines which are exactly opposite to the previous ones, inasmuch as they correspond to the top or crest of said coves. Consequently, the zones of the strip faces which come into contact with the rubbing surfaces of the slide, differ from those previously held by the projections of the pulling rolls, and therefore, the back of such projections may be knurled or otherwise wrought in such a way as to improve the grip of the pulling rolls on the strip, as the parts of the strip possibly spoiled by such knurling will not come into contact with the slide, and therefore, the latter will not be subject to the excessive wear and tear because of its friction against irregular surfaces of the strip.

The undulated or cross-ribbed or templated strip welding processes according to the invention, besides improving considerably the rigidity of the strip and consequently its feeding regularity and linearity, have also brought considerable and unexpected improvements in the electric behaviour of the strip. In fact, an undulated or cross-ribbed strip remains as flexible as a flat strip in respect to flexion parallel with its undulation or cross-ribs, and this allows an elastic fitting between the strip and the slide jaws, which improves the contact, and even more, when required by special welding techniques, would also enable, with convenient adaptation of the slide, welds and overlays on a curved surface to be performed.

Moreover, an undulated or cross-ribbed strip also has, with respect to a flat strip, a certain pliancy perpendicularly to the plan of the strip itself. Therefore, although still starting from a smooth strip, by increasing the grip pressure between the slide jaws and the opposite strip faces, a decisive and stable electric contact will be established between the electrodes connected with said jaws and the strip, in correspondence with the crests and backs of the undulated of the strip itself. Consequently, the flow of the electric current through the strip remains well defined and stable in time, so that distribution of the welding current across the strip is more uniform in a single strip and correspondingly in multiple strips, and strip fusion will be more uniform.

Wear and tear of slide due to friction of the strip against the jaws of the slide itself, does not occur casually but, in the slide jaws some wear grooves tend to form in correspondence with the jaw zones over which the crests of the cross-ribs constantly rub, so that in time, such wear can even improve electrical conductivity of contact between the slide and the strip. In this respect it would also be possible to predispose, purposely, some grooves or furrows in the slide, in correspondence with the crest of the strip cross-ribs.

In a device for carrying out the process of the invention, the slide could be furnished with a fixed jaw and one or more movable jaws set up on a ball-and-socket joint, with an adjustable pressure spring.

These and other characteristics of the invention, and advantages derived therefrom, will be evident from the following description of one of the perferred embodiments, executed as a non-limitative example, by reference to the attached drawing in which:

FIG. 3 is a close-up view illustrating on a different scale and with interruption of the parts, a detail of the pulling unit with cross-ribbed undulating rolls for the undulation of the strip which constitutes the filler metal electrode in the device of FIGS. 1 and 2.

FIG. 4 is another close-up view illustrating a detail of the slide spring vise, adjustable and articulated, which grips the undulated strip in the welding or overlaying device illustrated in the previous figures.

Figure 1:
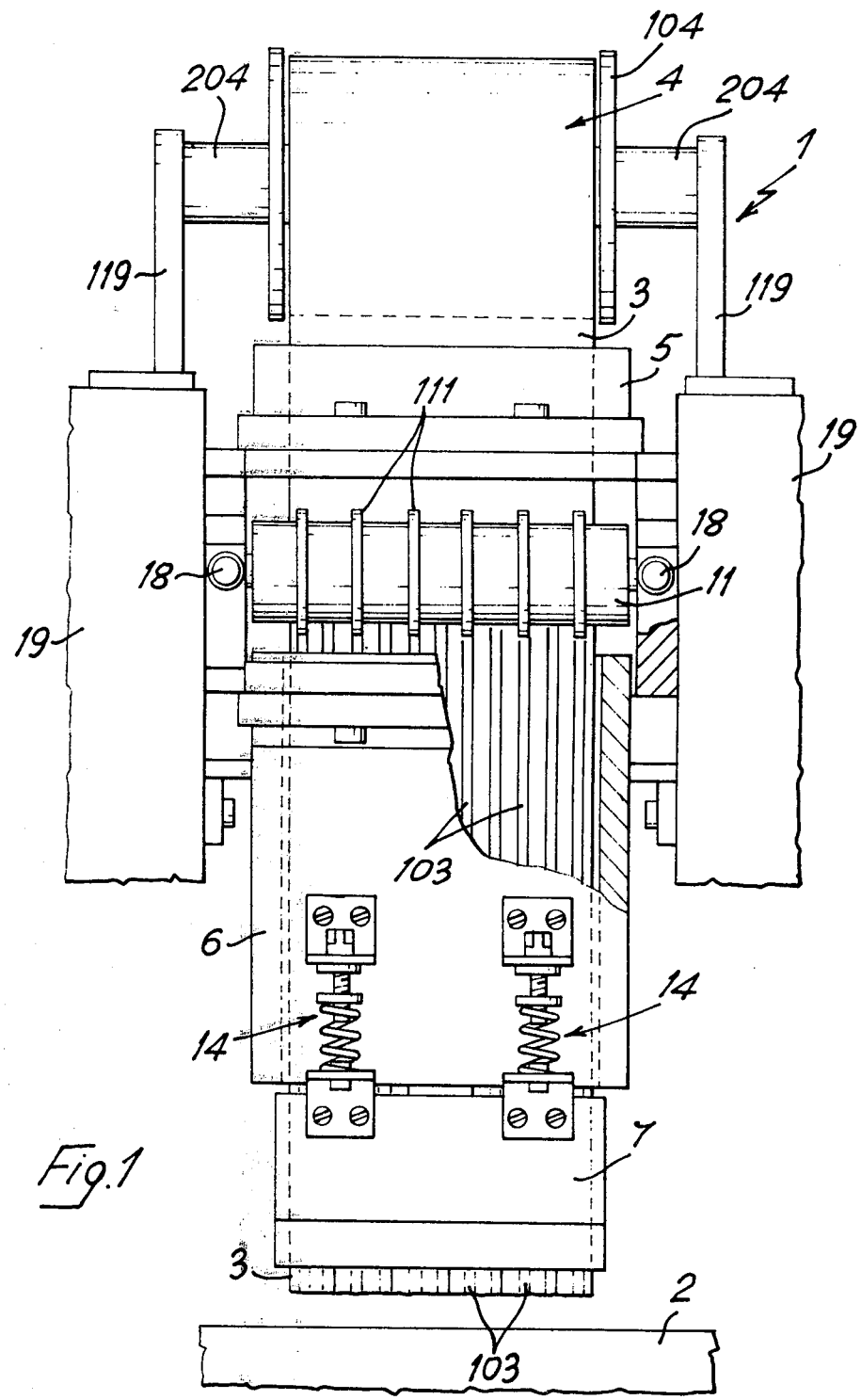
FIG. 1 is a front view with parts broken away of a continuous automatic arc welding device, with strip shaped electrode of filler material, undulated according to the process of the invention.
Figure 2:
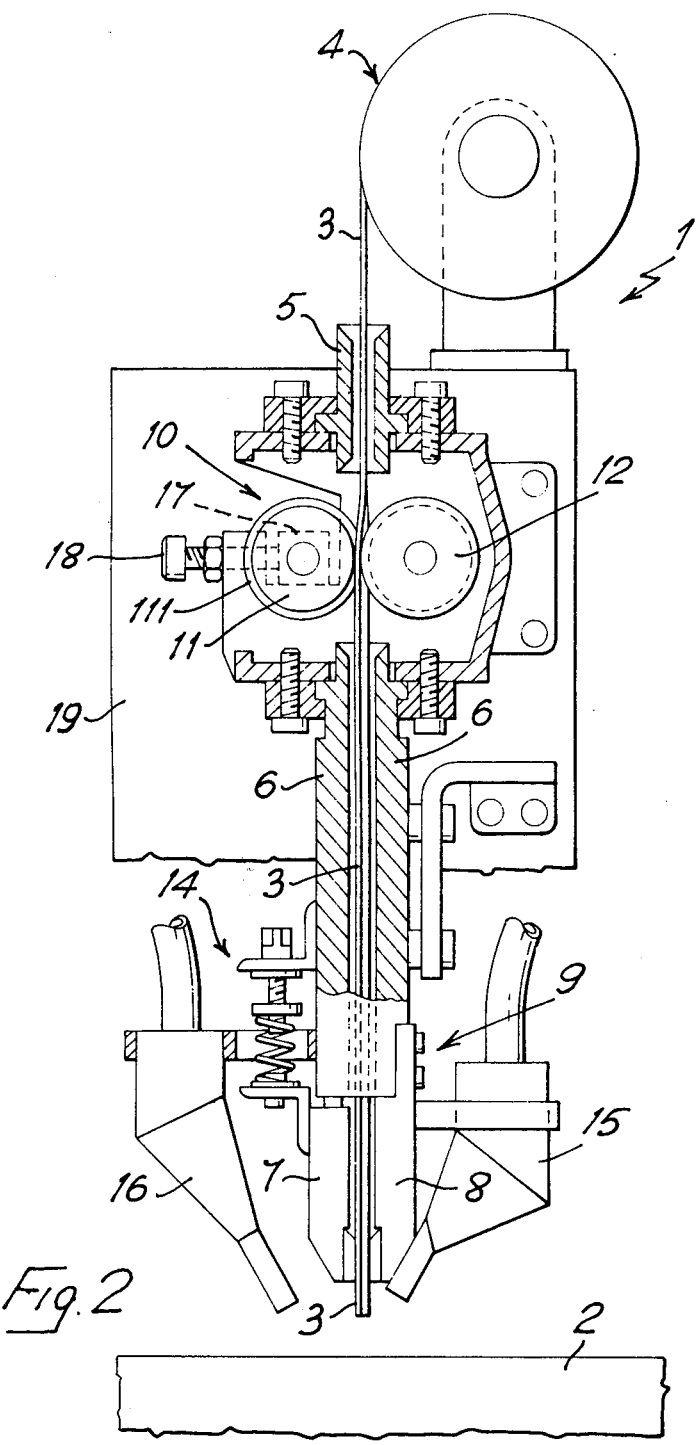
FIG. 2 is an upright side view in vertical section.

In an electric welding machine 1, operating according to the process of the invention, the welding filler material is fed in continuation at bench 2, on which is laid out the piece to be welded or overlaid, in the form of a strip 3, which is unwound regularly from a roll 4 and is pushed forward along a guide groove 5, 6 up to vises 7 and 8 of a pliers electrode 9 or so-called slide.

Unwinding of strip 3 from roll 4 and its feeding through the jaws 7 and 8 of pliers 9 is carried out by means of a pulling unit 10, in which the strip is passed through the bight of a pair of rolls 11 and 12 rotating in opposite directions, which unwind the strip by frictional force and force the same to pass between the jaws of the pliers. The reel 104 supports the roll 4 and turns on pivots 204 revolving in upper parts 119 of the machine framework 19.

Owing to a principal peculiarity of the invention the periphery of the pulling rolls 11 and 12 is shaped in such a way that the strip 3, while being dragged by the rolls themselves, is also templated longitudinally by the same, according to the undulated or cross-ribbed profile desired.

In the embodiment illustrated as an example, each pulling roll 11 and 12 shows peripherally a particular series of annular projections 111, 112, axially interspaced between one another with the projections of a series axially joggled in respect to those of the other series, as well as radially interspersed with the latter for a certain depth of interspersion. In this way, the flat metal strip 3 will be gripped and forced to pass through these interspersed projections 111 and 112, which will thus deform the strip itself with a longitudinal series of undulated 103, which depend on the number, on the setting and on the profile as well as on the depth of the interspersion of the projections themselves.

As is clearly shown by the drawings, the back of the projections 111 and 112 of pulling rolls 11 and 12, holds strip 3 along the lines which correspond with the concave side or groove of each undulation 103 of the strip 3, while the slide 9 and jaws 7 and 8, hold the strip itself along lines which are exactly opposite to the previous ones, inasmuch as they correspond to the top, or crest, of the undulated 103. It follows that those zones of the strip faces, which come into contact with the dragging surfaces of jaws 7 and 8 of slide 9, differ from those which were held by projections 111 and 112 of pulling rolls 11 and 12, and therefore the bottom of these projections can be knurled or otherwise wrought in such a way as to improve the grip on strip 3 of pulling rolls 11 and 12 of strip undulated 103 which will be dragged against the slide jaws on the concave side possibly spoiled by such knurling and therefore there will be no undue wear and tear of the slide, even if its holding pressure on the strip is unusually accentuated.

In carrying out the process as illustrated by an example of an automatic, continuous, electric arc welding or overlaying device, jaw 8 of slide 9 is directly fixed to the body of guide 6 of strip 3, while jaw 7 is joined to the body itself by means of ball joint 13, working jointly with an elastic pressure set, adjustable at 14, which is preferably of the compressed helical spring type 114, where calibration of the spring enables the strength with which strip 3 is pressed between jaws 7 and 8 to be regulated.

Through the funnel shaped runners 15 and 16 also incorporated in the body 6, the fluxing agent or flux is fed to the welding arc front attack between the pieces to be welded, placed on bench 2 and the head line of welding strip 3.

In order to regulate the depth of interpersing between the peripherical rib 111 and 112 of the pair of pulling rolls 11 and 12, pivots 211 of roll 11 are supported in blocks 17, which are radially guided, slipping to and from the axis of rotation of the other roll 12, in the machine framework 19, controlled by adjustable blocking screws 18.

In practice the working movement or feeding motion is generally performed by bench 2 which, therefore, will form part of a movable structure with the trolley, which should be operated in a certain way in correlation with strip 3 feeding motion, the motion of which is obtained by controlling the operating means connected to the pulling units 11 and 12.

Regarding the opening of jaws 7 and 8 of slide 9, it is possible to envison any quick operating device for unblocking them, for example an eccentric releasing device.

Although as an example there has been described here an executive form of an electric arc welding or overlaying machine with flat, undulated or ribbed electrode, which carries out the process according to the invention, it is understood that the invention is not limited to it or by it, but it can be widely varied, from the point of view of practical realization, as well as applied for other purposes, even other than the specifically indicated purposes of arc welding or overlaying without, for this, excluding the wider range of protection of the informative conception of the invention itself, as heretofore stated and claimed. It will be evident that multiple strips can be used between the same presser rolls.

Having thus described my invention, what I claim as new and desire to secure by Letters Patent is:

1. An electric welding or overlaying process by submerged arc which comprises unwinding filler material strip from a roll, feeding the strip between jaws of a vise which pulls the strip forward and supplies electric current, maintaining an arc between the strip and the work, submerging the arc beneath a flux and continuously deforming the strip laterally to produce undulations along the strip by rolls with knurled ribs in contact with the concave surfaces of the resulting undulations and by smooth rolls opposite the corresponding convex surfaces, so as to produce compulsory contact between the strip and the slide jaws and preferred electrical current paths between the strip and the work to provide smooth arcing across the strip.

2. A device for arcwelding or overlaying, comprising means for supporting and feeding a coil of metallic filler strip to the device, means for pushing the strip between vises on the strip, means for maintaining an arc between the strip and the work, means for maintaining flux above the work and means for deforming the strip to produce undulations longitudinally over the strip by rolls having knurled ribs producing the concave surfaces of the undulations.

* * * * *